United States Patent [19]

Whitcomb

[11] 4,442,628

[45] Apr. 17, 1984

[54] ROOT-PRUNING CONTAINER

[75] Inventor: Carl E. Whitcomb, Stillwater, Okla.

[73] Assignee: Board of Regents for Oklahoma Agricultural & Mechanical Colleges Acting for Oklahoma State University, Stillwater, Okla.

[21] Appl. No.: 486,985

[22] Filed: Apr. 20, 1983

[51] Int. Cl.³ .............................................. A01G 31/00
[52] U.S. Cl. ............................................ 47/66; 47/73
[58] Field of Search .................... 47/66, 73, 77, 85, 86, 47/87

[56] References Cited

U.S. PATENT DOCUMENTS 3,339,310 9/1967 Solomon ................................. 47/66
3,800,469 4/1974 Lau, Jr. et al. ......................... 47/66
4,057,931 11/1977 Stutelberg et al. ..................... 47/66

Primary Examiner—Robert A. Hafer
Assistant Examiner—Bradley M. Lewis
Attorney, Agent, or Firm—Head, Johnson & Stevenson

[57] ABSTRACT

A root-pruning container involving a series of vertical pyramid like staircase stepped surfaces essentially parallel to the sidewall of said container and displaced to the inside of said container, wherein the vertical and horizontal surfaces forming the steps between the inner pyramid like surface and the outer container sidewall are intentionally sloped behind said pyramidal surface such as to form an acute angle of intersection with the container's sidewall. Because of the acute angle of the step, the root tips of a growing plant are directed into and trapped at the toe position of each individual step resulting in termination of the root growth (root-pruning). Such a container inhibits spiral growth, promotes root branching and results in more even root distribution as well as increased root growth in the growing medium.

5 Claims, 6 Drawing Figures

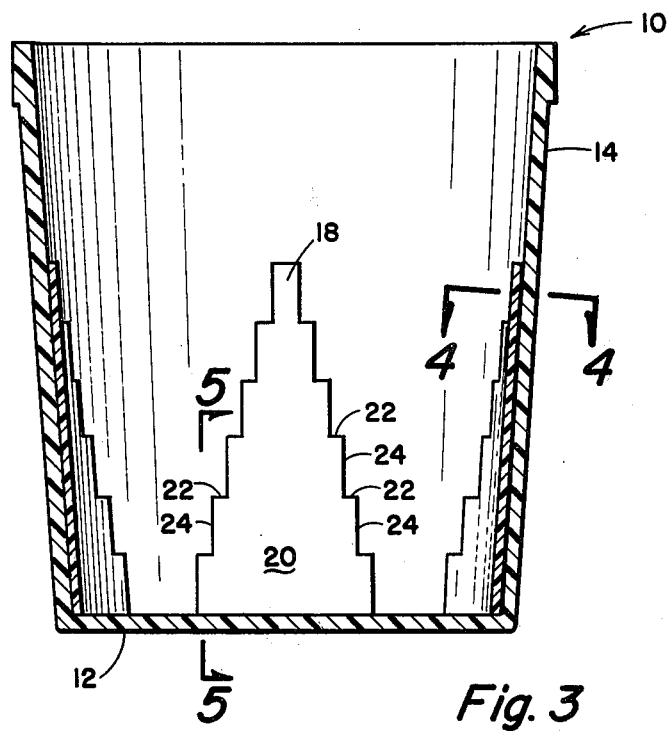
Fig. 3
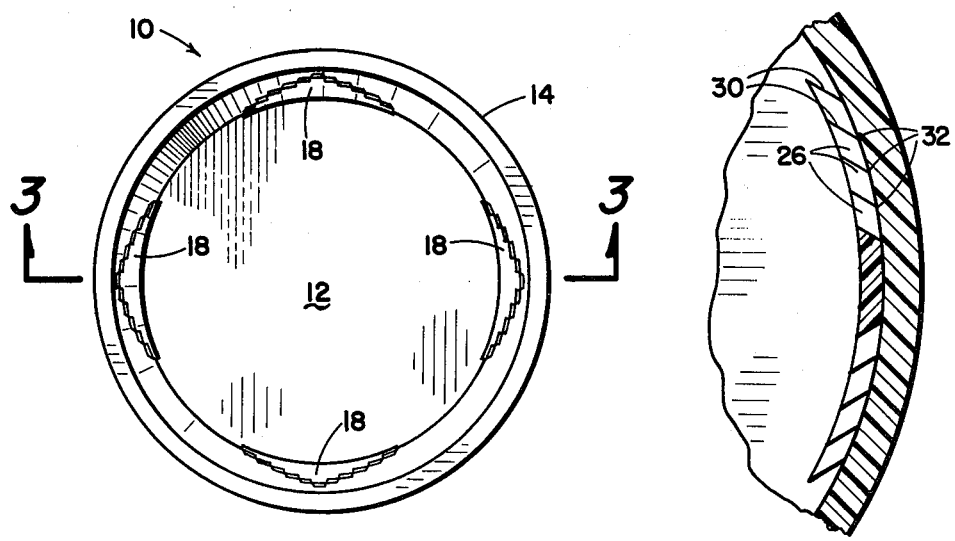
Fig. 2
Fig. 4

ROOT-PRUNING CONTAINER

BACKGROUND OF THE INVENTION

1. Field of the Invention

This invention relates to an improved nursery or greenhouse container or pot. More specifically, the invention relates to an apparatus and method for root-pruning of plants grown in containers.

2. Description of the Prior Art

Plants have long been grown in pots in greenhouses and homes. The practice of producing large numbers of plants out-of-doors in containers has developed primarily since the early 1950's. The container nursery industry began in southern California and spread across the southern states. The #10 food can with a few holes punched in the bottom was widely used and soon became known as the "one gallon container". During the sixties and seventies, the container nursery industry increased rapidly for several reasons: (1) landscape plants grew at a faster rate in containers than in the field; (2) turnover time decreased; (3) the root system of the plant remained undistrubed; thus, planting could be done anytime, not just during the early spring as as with bare root or balled-in-burlap nursery stock; and (4) ease of display and handling made container grown plants attractive to the consumer.

However, development of the container nursery industry was not without problems. The complex nutritional requirements of plants grown in containers took years to define. In addition, growing media was refined until the quality of plant growth in containers attained that of field grown plants. The medium for the container evolved from field soil, to mixes of field soil and compost, to soil-less mixes with far greater pore space for providing oxygen to the root system.

Numerous articles have been written and a common topic at gatherings of nurserymen is root development, especially of woody plants, in containers. As a root grows from a cutting or seedling in a container, its path is outward (towards the side of the container) and downward. When the root reaches the side of a round container, it follows the contour and generally after one half to one full circle, reaches the bottom where it may continue to elongate and circle, sometimes for five or more revolutions, all of which is considered to be deleterious to the plant.

In "Growth of *Carissa grandiflora* 'Boxwood Beauty' in varying media, containers, micronutrient levels", *The Florida Nurseryman*, 17 (4): 12–13, 43 (1972) Whitcomb tried placing holes in the sides of containers to improve root growth but without success (see also U.S. Pat. No. 3,785,088). Later studies with tree seedlings grown in square bottomless containers on a raised wire bench showed that air-root-pruning was effective in stopping root elongation and wrapping at the bottom of the container and, at the same time, in stimulating lateral branch root development following the death of the root tip, Davis et al, "Effects of Propagation Container Size on Development of High Quality Tree Seedling", *Proc. Int. Plant Soc.*; 25:448–453 (1975). More recent studies showed that Bur oak trees (*Quercus macrocarpa*) grew larger and developed a more fibrous root system in a square bottomless container than in a conventional round container of the same volume, Hathaway and Whitcomb, "The Effects of Root Malformation during Propagation on Growth and Survival of Bur Oak", Research Report P-760, Oklahoma Agricultural Experimental Station, Oklahoma State University, pages 33–34 (1977). Unfortunately, growing plants in bottomless containers on raised wire benches is neither practical nor economical. Birchell and Whitcomb, "Effects of Container Design on Root Development and Regeneration", Research Report P-760, Oklahoma Agricultural Experimental Station, Oklahoma State University, pages 39–45 (1977) compared the growth of birch trees grown in bottomless containers with vertical ribs on the sides. The vertical ribs stopped the circling or the wrapping of the roots of a fine, fibrous rooted species such as the birch. In addition, when the vertical ribs were present, there was no advantage to removing the bottom of the container for air-pruning. Dickson and Whitcomb, "Effects of Container Design on Root Quality", Research Report P-760, Oklahoma Agricultural Experimental Station, Oklahoma State University, pages 35–36 (1977) tried placing ribs across the bottom of a round container and vertical ribs one fourth to one half the height of the sidewall of the container in order that the container could be nested for stacking and shipping. Japanese black pine (*Pinus thunberi*) and bald cypress (*Taxodium distishum*) trees were grown in these containers for one growing season. The vertical ribs in the lower one fourth or one half of the container were effective in stopping circling of the pine roots; however, the more coarsely rooted cypress either bent the rib and continued to circle or was stopped by the rib from circling but continued to elongate creating a "tangled ball of string" effect.

Dickinson and Whitcomb, "The Effects of Spring Versus Fall Planting on Establishment of Landscape Plants", *S.N.A. Nursery Research Journal* 4 (1): 9–19 (1977) observed that the roots of container grown plants that developed following planting were extensions of roots that were already present in the container at the time of planting, and were not "new" roots. They suggest that the number of root tips present at planting time may be very important to the rapid establishment and frequently the survival of the container grown plants in the landscape.

These studies showed that the root system of a plant grown in a container could be improved (a) as in the case of bottomless containers on a wire bench and (b) that vertical ribs on the inside of the container could improve the root structure of fine, fibrous rooted plants, but only worsened the problem for strong, coarsely rooted plants. Also, neither improvement was practical for the production of nursery stock on a commercial scale.

SUMMARY OF THE INVENTION

In view of the problems associated with root development in plants grown in containers, I have discovered an improved container adapted to contain a growing medium and a plant comprising:

(a) a bottom wall;

(b) a circumferential upwardly extending sidewall attached to the perimeter of the bottom wall thus forming an open-topped container; and (c) at least one root-pruning means comprising an inner sidewall segment essentially parallel to the circumferentially upwardly extending sidewall and displaced to the inside of the open-topped container wherein the perimeter of the inner sidewall segment is a plurality of vertical and horizontal intersecting edges proceeding from the bottom of the container to the top of the inner sidewall segment on both sides of the inner sidewall segment thus forming a pyramid like series of steps and wherein the vertical and horizontal edges of the pyramid like series of steps are connected to the circumferentially upwardly extending sidewall by essentially flat surfaces that recede behind the inner sidewall segment at an acute angle to the circumferential upwardly extending sidewall, thus forming root-pruning traps at the toe position of each of the steps.

The present invention further provides that a plurality of root-pruning means be distributed about the inner surface of the container and that each employ a plurality of steps ascending each side of the root-pruning means (e.g., four pyramidal staircases of up to six steps evenly distributed around the inside of a one gallon nursery container). Preferably, the root-pruning means (e.g., pyramidal staircase of sloped steps) can be fabricated into the interior of the nursery container sidewall at the time of manufacturing the container. In this manner, the exterior of the sidewall of the container at the location of the pyramidal staircase can be recessed such as to allow the container to be stacked when not in use.

Thus the present invention provides in a process for growing a plant in a growing medium contained in a pot having a bottom and a circumferential sidewall the specific improvement comprising the step of pruning the roots of the plant along one or more interior step formed between an interior sidewall segment essentially parallel to the circumferential sidewall and displaced to the inside of the circumferential sidewall and a series of essentially vertical and horizontal surfaces therebetween wherein the vertical and horizontal surfaces recede behind the inner sidewall segment and intersect the circumferential sidewall at an acute angle forming root-pruning trap at the top position of the step, thus inhibiting the tendency of the roots to grow in a spiral and stimulating additional root branching.

It is an obeject of the present invention to provide a container that prunes the roots of the plant growing in the container. It is a further object that this pruning take place along root traps distributed around the container sidewalls such as to prevent spiral root growth and such as to promote root branching. It is a further object that the container be consistent and essentially interchangeable with containers presently used in the commercial container industry for growing plants. Fulfillment of these objects and the presence and fulfillment of other objects will be readily apparent upon complete reading of this specification and claims taken in conjunction with the attached drawings.

BRIEF DESCRIPTION OF THE DRAWINGS

FIG. 2 is a top view of the container of FIG. 1.

FIG. 3 is a cut-away side view of the container of FIG. 2 as seen through line A—A.

FIG. 4 is a cross-sectional top view of the root-pruning structure illustrated in FIG. 3 as seen through line B—B.

DESCRIPTION OF THE PREFERRED EMBODIMENTS

Figure 1:
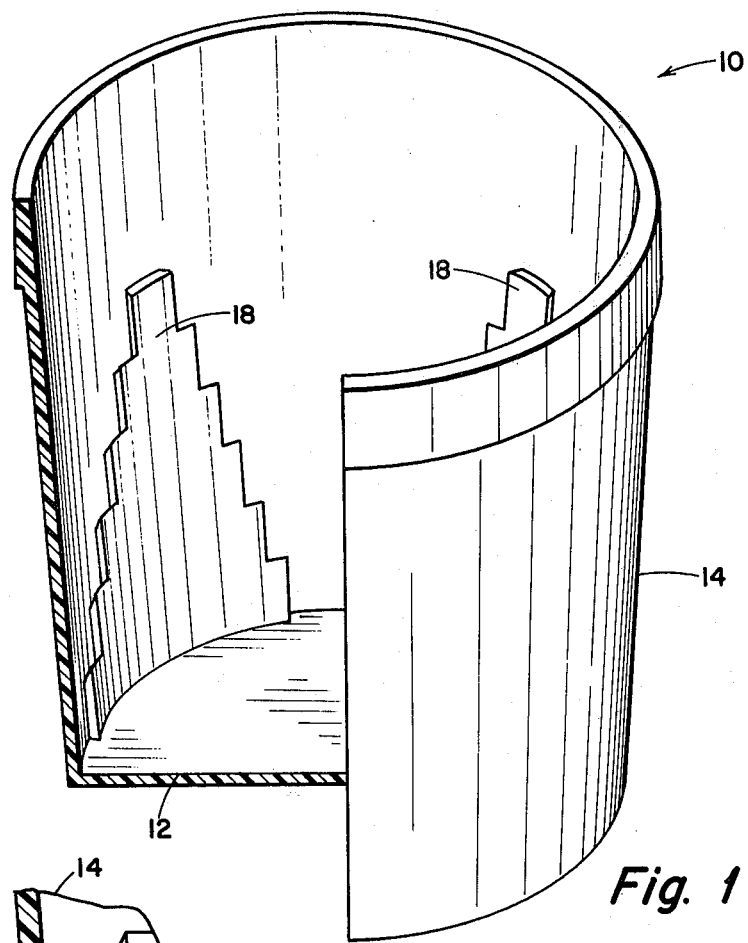
FIG. 1 is a partial cut-away perspective view of a nursery stock container equipped with a root-pruning structure within the container according to the present invention.

The root-pruning container of the present invention, how it functions and how it differs from other nursery stock containers can perhaps be best explained and understood by referencing the drawings. The figures illustrate one embodiment of a root-pruning container according to the present invention, generally designated by the numeral 10. As seen in FIG. 1, the container 10 is made up of a circular flat bottom 12 and a circumferential upwardly and outwardly sidewall 14 attached to the perimeter of the bottom 12. Displaced around the inner surface of the container are a series of four essentially vertical root-pruning means 18, each evenly distributed around the sidewall 14 (approximately every six inches for one gallon container). With a larger container, say twelve inches in diameter, there would preferably be six or more root-pruning means, again evenly distributed, to give optimum root-pruning. Likewise, in a smaller pot only two or three root-pruning means may be needed.

As illustrated in FIG. 3, each root-pruning means 18 involves a pyramid like surface 20 essentially parallel to the container sidewall 14, but displaced to the inside of the container 10. As shown, the perimeter of the surface 20 is comprised of a series of horizontal and vertical edges 22 and 24 intersecting at essentially right angles creating what appears to be a staircase profile as viewed from within the container.

Figure 5:
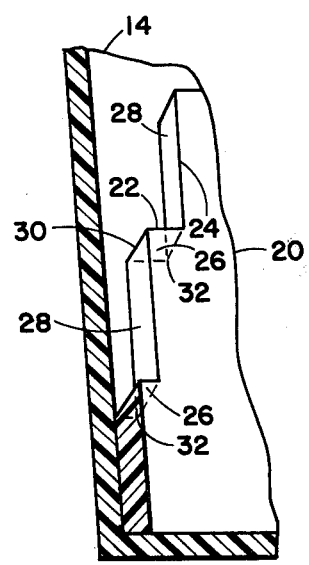
FIG. 5 is a cross-sectional side view of the root-pruning structure illustrated in FIG. 3 as seen through line C—C.
Figure 6:
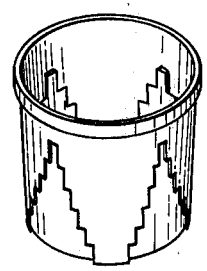
FIG. 6 is a perspective view of an alternate embodiment of the container according to the present invention illustrating external recesses in the container sidewall which more readily accommodate stacking of the container when not in use.

As illustrated in FIGS. 4 and 5, a series of essentially flat surfaces 26 and 28 extend from the horizontal and vertical edges 22 and 24, respectively, of surface 20 to the inside of container sidewall 14. Both horizontal and vertical surfaces 26 and 28 recede behind surface 20 as they approach sidewall 14, thus forming acute angles at the intersection. Consequently, the series of surfaces 26 and 28 intersect with each other forming a series of steps 30 wherein the toe position of the respective steps are sloped towards the sidewall 14 forming a series of root traps 32.

Because of the pyramid like profile or configuration of the root-pruning structure, the root traps are distributed at various elevations from the bottom of the container and are also distributed radially around the inner surface of the sidewall of the container. In this manner, the root growth of the plant being grown in the container will propagate outwardly and downwardly until it is turned by the presence of the container sidewall. The root then proceeds to encircle the container along the curved sidewall until it strikes a root-pruning structure 18. Surfaces 26 and 28 of steps 30 will then direct the root growth into the trap 32 whereupon further growth abruptly stops. Because of the physical entrapment of the root and cessation of growth, the root responds as if it were physically pruned in that secondary branching takes place on the terminated root. This in turn leads to a very fibrous root structure free of the conventional root swirl common to container grown plants. The marked increase in the number of root tips existing in the container aids in restabling the plant upon transplanting from the container.

In testing the new container design, young Virginia pine plants were grown in the new root-pruning containers and in conventional plastic containers with smooth interiors under identical conditions. After four months of growth in the respective pots, the pine trees were terminated and the root structures were examined and compared. A 300 percent increase in root branching (i.e., 2,644 roots versus 868 roots) were observed for the root-pruning container grown plant relative to the smooth walled grown plant. Physical examination of the root-pruning container grown plant further indicated that the tip of the root was, in fact, trapped in one of the stair step corners. This physical restriction to further elongation of the root caused branching to occur much like air-root-pruning. Furthermore, the absence of root swirl or spiral growth was observed in the root-pruning container.

With plants grown in the conventional container, only a few root tips exist at the bottom of the container. At the time of planting in the landscape, these root tips extend into the surrounding soil. Thus, in the case of the plant grown in the root-pruning container, the marked increase in the number of root tips existing at planting time results in accelerated establishment of the plant in the landscape. The more even distribution of root development throughout the container medium, instead of most roots developing in a spiral pattern on the very bottom of the container, further promotes accelerated establishment of the plant. Stimulated branch root development enhances further plant growth by increasing the root surface area which in turn promotes increased absorption of water and nutriments.

Additional advantages associated with the use of the root-pruning container of the present invention include the fact that the container has a conventional bottom for ease of filling, handling, and shipping. The containers can be filled by existing commercial pot fillers without modification. The root-pruning container according to the present invention can be manufactured by any of the methods well known in the art out of essentially any of the conventionally used materials. Preferably, the container with root-pruning means is fabricated by blow molding, injection molding or the like using a conventional thermoplastic resin or the equivalent. As such, the containers will nest or stack such that freight costs for shipping the containers from manufacturers to nurserymen is not increased.

Having thus described the preferred embodiments with a certain degree of particularity, it is manifest that many changes can be made in the details of construction, arrangement and fabrication of the elements without departing from the spirit and scope of the invention. Therefore, it is to be understood that the invention is not limited to the embodiments set forth herein for purposes of exemplification, but is to be limited only by the scope of the attached claims, including the full range of equivalents to which each element thereof is entitled.

I claim:

1. A container adapted to contain a growing medium and a plant comprising:
   (a) a bottom wall;
   (b) a circumferentially upwardly extending sidewall attached to the perimeter of said bottom wall thus forming an open-topped container: and
   (c) at least one root pruning means comprising an inner sidewall segment essentially parallel to said circumferentially upwardly extending sidewall and displaced to the inside of said open-topped container wherein the perimeter of said inner sidewall segment is a plurality of vertical and horizontal intersecting edges proceeding from the bottom of said container to the top of said inner sidewall segment on both sides of said inner sidewall segment thus forming a pyramid like series of steps and wherein the vertical and horizontal edges of said pyramid like series of steps are connected to said circumferentially upwardly extending sidewall by essentially flat surfaces that recede behind said inner sidewall segment at an acute angle to said circumferential upwardly extending sidewall, thus forming root-pruning traps at the toe position of each of said steps.

2. A container of claim 1 wherein a plurality of said root-pruning means are distributed about the inner surface of said container.

3. A container of claim 2 wherein four of said root-pruning means are employed with a plurality of steps ascending each side of said pyramid like inner sidewall segment of each of said root-pruning means.

4. In a container for growing nursery stock, the specific improvement comprising; a plurality of root-pruning means wherein each root-pruning means comprises:
   (a) an inner sidewall segment essentially parallel to said circumferentailly upwardly extending sidewall and displaced to the inside of said open-topped container wherein the perimeter of said inner sidewall segment is a plurality of vertical and horizontal intersecting edges proceeding from the bottom of said container to the top of said inner sidewall segment on both sides of said inner sidewall segment thus forming a pyramid like series of steps and wherein the vertical and horizontal edges of said pyramid like series of steps are connected to said circumferentially upwardly extending sidewall by essentially flat surfaces that recede behind said inner sidewall segment at an acute angle to said circumferential upwardly extending sidewall, thus forming root-pruning traps at the toe position of each of said steps.

5. In a process for growing a plant in a growing medium contained in a pot having a bottom and circumferential sidewall, the specific improvement comprising the step of pruning roots of said plant along at least one interior step formed between an interior sidewall segment essentially parallel to said circumferential sidewall and displaced to the inside of said circumferential sidewall and a series of essentially vertical and horizontal surfaces therebetween wherein said vertical and horizontal surfaces recede behind said inner sidewall segment and intersect said circumferential sidewall at an acute angle forming a root-pruning trap at the toe position of said step, thus inhibiting the tendency of said roots to grow in a spiral and stimulating additional root branching.

* * * * *